March 20, 1945.  W. J. FEDORCHAK  2,371,748
ARTICLE HANDLING APPARATUS
Filed Jan. 29, 1943  4 Sheets-Sheet 1

Inventor
Wm J. Fedorchak
By Rule and Hoge
Attorneys

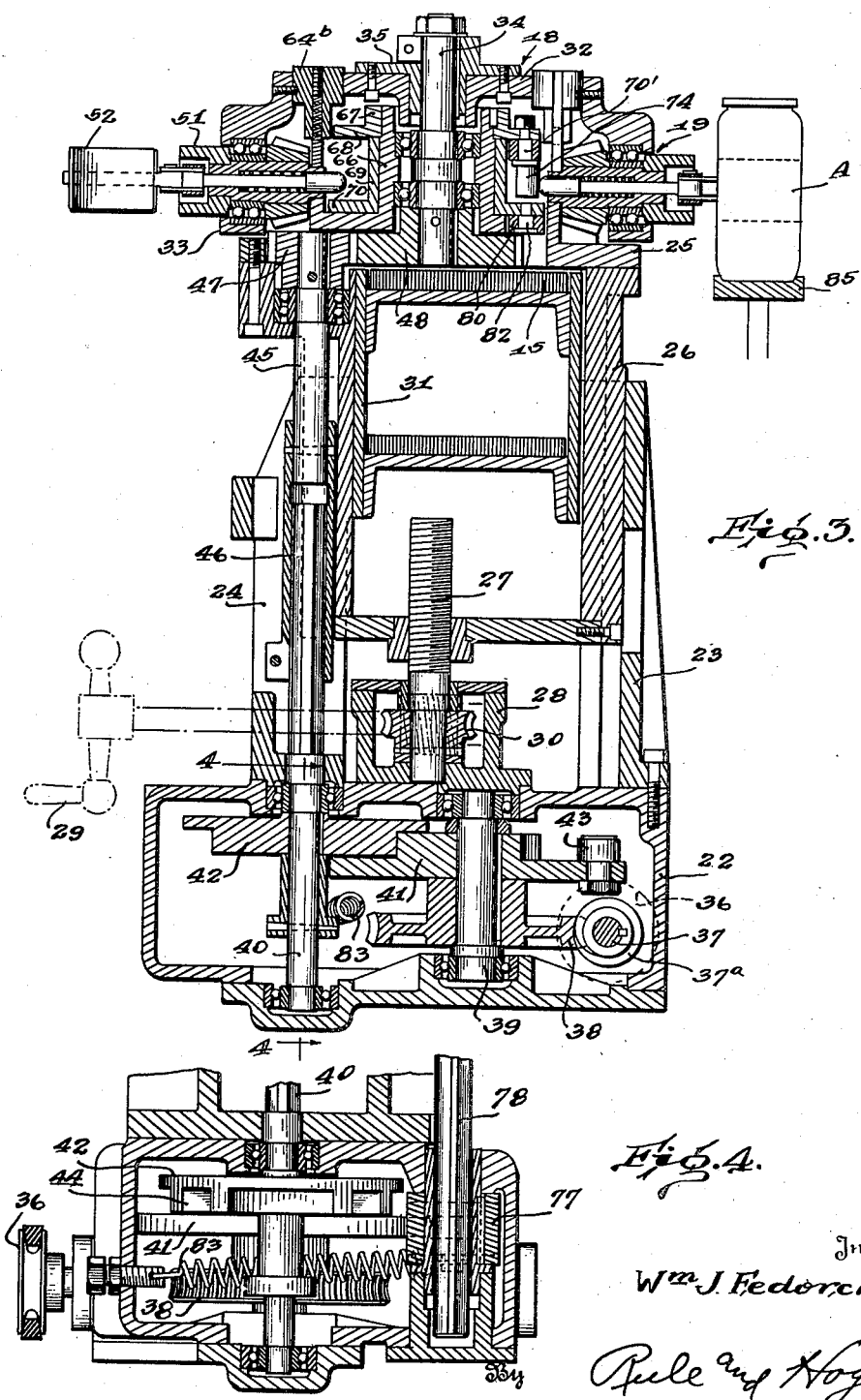

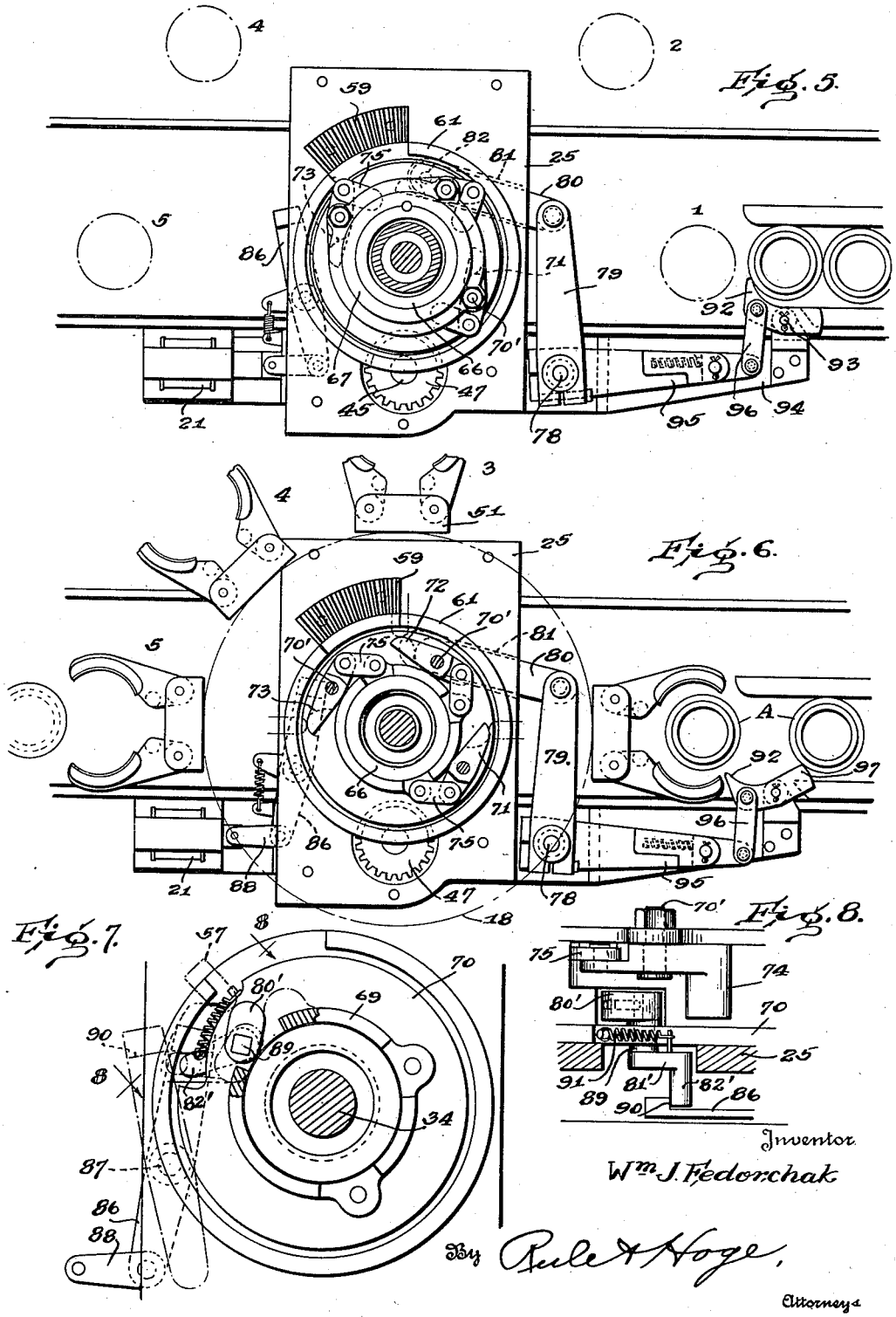

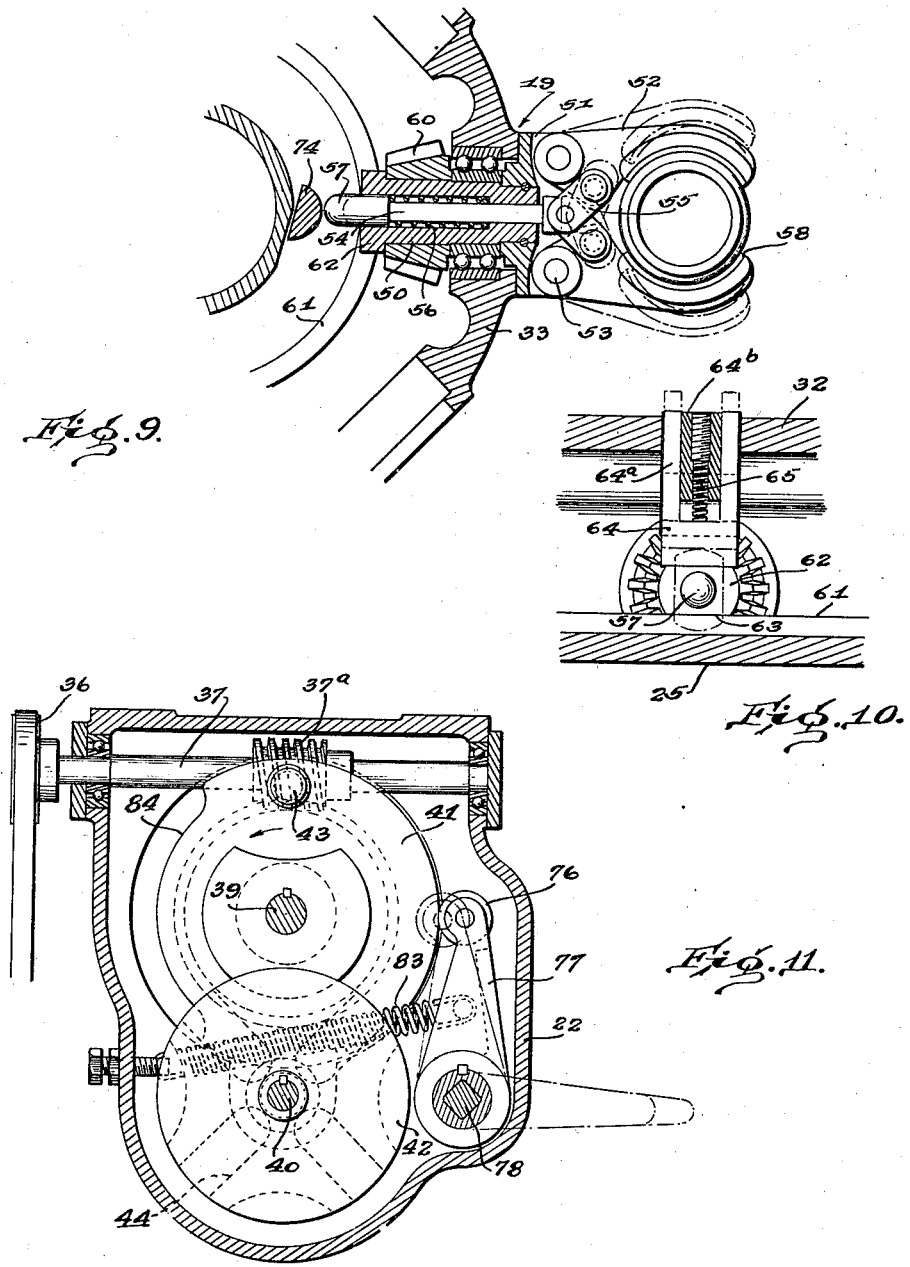

Patented Mar. 20, 1945

2,371,748

UNITED STATES PATENT OFFICE 2,371,748

ARTICLE HANDLING APPARATUS

William J. Fedorchak, Granite City, Ill., assignor to Owens-Illinois Glass Company, a corporation of Ohio Application January 29, 1943, Serial No. 473,908

6 Claims. (Cl. 198—210)

My invention relates to apparatus for conveying articles to a predetermined position, for example, to a machine for gaging or testing the articles and thereafter conveying the articles away from such position, and also includes automatically operated selective means for segregating defective ware from the articles which have passed the test.

An object of my invention is to provide a novel and practical apparatus for handling bottles, jars, or other ware, carrying them on a single line conveyor and delivering them to a testing or gaging machine and after they are tested, returning them to the conveyor by which they may be transferred to a packing station or other desired position.

A further object of the invention is to provide means by which articles which have failed to meet the required tests are segregated from the other articles.

A further object of the invention is to provide novel means for inverting the articles after they have been gaged or tested, to facilitate inspection.

Other objects of the invention will appear hereinafter.

Referring to the accompanying drawings:

Fig. 3 is a cross-sectional view of the apparatus taken centrally of the carriage.

Fig. 4 is a section at the line 4—4 on Fig. 3 showing a portion of the driving mechanism.

Fig. 5 is a part sectional plan view adjacent the upper end of the carriage drive shaft, but with the carriage removed.

Fig. 6 is a similar view at a somewhat lower plane and with the parts in different positions.

Fig. 7 is a fragmentary sectional plan showing particularly the means for automatically opening a pair of gripping jaws for discharging a defective article.

Fig. 8 is a section at the line 8—8 on Fig. 7.

Fig. 9 is a fragmentary sectional view showing one of the article carrying heads and a means for actuating the holding jaws.

Fig. 10 is a sectional elevation showing means for holding one of the heads against rotation.

Fig. 11 is a sectional plan showing the Geneva gear drive.

The apparatus as herein illustrated and described, is particularly adapted for handling bottles or jars A, but the invention is not limited to such use.

Figure 1:
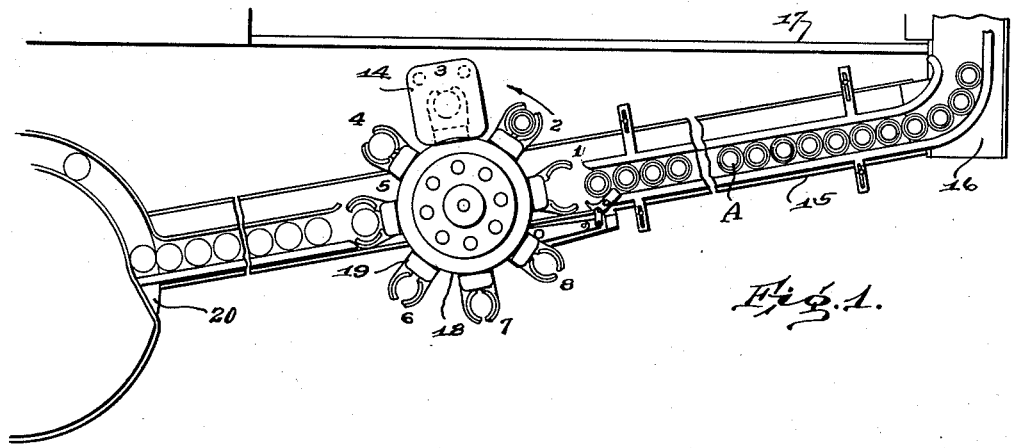
Fig. 1 is a diagrammatic plan view of an apparatus embodying the principles of my invention and designed for handling jars or like articles.
Figure 2:
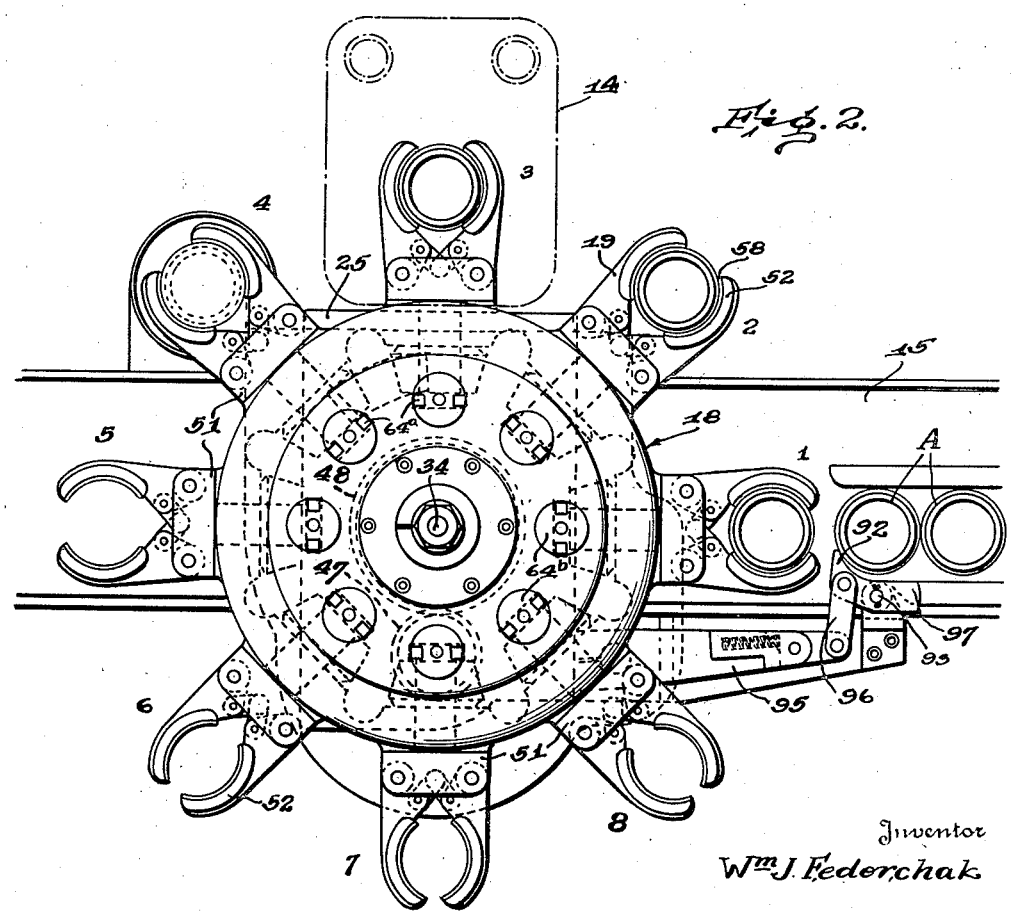
Fig. 2 is a plan view on a larger scale, showing particularly the rotatable carriage.

In general terms, the apparatus comprises an endless conveyor 15, to which the articles A are delivered from a cross-belt conveyor 16 (Fig. 1) at the discharge end of an annealing leer 17. The conveyor 15 which may be driven continuously, carries the articles to an apparatus comprising a carriage 18, on which article carrying heads 19 are mounted and arranged in an annular series. The carriage is intermittently rotated step-by-step for bringing each head 19 to stations numbered 1 to 8. Each head comprises a pair of gripping jaws which are automatically opened at station 1 for receiving an article from the conveyor, the jaws being then closed to grip the article. At station 3 the jaws are opened to release the article to a testing or gaging machine 14. After the article has been tested it is again delivered to the carrying head and conveyed to station 4 and unless it has been registered as defective by the testing machine, is carried to station 5. At the latter, the jaws are again opened for delivering the tested article to the conveyor 15 by which it is transferred to a rotary packing table 20. During the movement of the head 19 between stations 3 and 4, it is automatically rotated about a horizontal axis radial to the carriage as hereinafter described for inverting the article so that the latter is delivered in an inverted position to the conveyor at station 5. When an article fails to pass the test to which it is subjected by the gaging or testing machine, the latter operates to establish a circuit for an electromagnet 21 (Figs. 5 and 6). The latter operates mechanism for automatically opening the holding jaws by which the defective article is carried when the latter reaches station 4 and thereby discharges the article before it reaches the conveyor 15. In this manner the defective articles are separated from those which are delivered to the packing station.

A more detailed description of the apparatus will now be given. Referring particularly to Fig. 3, the intermittently rotating carriage 18 is supported on a framework including a base 22 in the form of a casing which provides a housing for a Geneva driving mechanism. Standards 23 and 24 (Fig. 3) are bolted to the base 22. A rectangular platform 25 (Figs. 3, 5, and 6) on which the carriage 18 is mounted, is supported on an upper frame 26 which is mounted for vertical adjustment in guideways in the standards 23 and 24. Means for adjusting the frame 26 and carriage up and down includes a vertical shaft 27 screw threaded through a bushing in the frame 26 and journaled in a bearing box 28 on the machine base. The shaft 27 is rotatable manually for adjusting the frame by means of a hand crank 29 which operates a worm gear 30 keyed to the shaft 27.

The endless conveyor 15 is mounted on a stationary conveyor frame 31 which extends horizontally through the open frame 26. By adjusting the carriage 18 up and down relative to the conveyor by means of the hand crank 29, the apparatus is adapted for handling articles of different heights.

The carriage 18 comprises a horizontal circular plate 32 which, as shown, is provided with an integral depending flange or skirt 33 in which the heads 19 are rotatably mounted. The carriage includes a central shaft 34 connected to the plate 32 through a flanged bushing 35 bolted to said plate and in which the shaft is keyed. The carriage is driven by means of an electric motor (not shown) having driving connections including a belt and pulley 36 (Figs. 3, 4, and 11), the pulley being mounted on a worm shaft 37 journaled in the housing 22. A worm 37a on said shaft drives a worm gear 38 keyed to a shaft 39. The shaft 39 operates through a Geneva gear drive to impart intermittent rotation to a shaft 40 journaled in the gear box 22. The Geneva drive, which may be of conventional construction, includes rotary disk-shaped members 41 and 42 keyed to the shafts 39 and 40 respectively. The member 41 carries a driver 43 which engages radial guideways 44 in the disk 42 for rotating the latter. The shaft 40 extends upwardly above the casing 22 and has a driving connection with a shaft 45 journaled in the frame 26 and adjustable up and down with the carriage. The said connection includes a tubular shaft section 46 keyed to the shaft 45 and splined on the shaft 40. The shaft 45 carries at its upper end a pinion 47 which drives a gear 48 keyed to the carriage shaft 34.

Each of the heads 19 includes a tubular shaft 50 (Fig. 9) extending radially of the carriage and journaled in the flange 33. Fixed to the outer end of the shaft 50 is a yoke 51 in which a pair of jaws 52 are mounted to swing on pivots 53. Means for swinging the jaws about their pivots includes an actuating rod 54 extending lengthwise through the tubular shaft 50 and operatively connected with the jaws by a pair of links 55. The jaws are swung to an article gripping position by a coil spring 56 housed in the shaft 50 and held under compression by a head 57 on the rod 54. The jaws are faced with a padding 58 of rubber or other soft material.

The carriage is intermittently rotated step-by-step by means of the Geneva drive, the gearing being so proportioned that each head is brought to rest at each of the stations 1 to 8 in succession. Each head while moving from station 3 to station 4 is rotated about its axis through 180° by means of a stationary segmental gear 59 (Fig. 5) which rotates a pinion 60 secured to the shaft 50. In this manner each of the jars A is swung from an upright position and delivered to the conveyor in an inverted position at station 5.

The heads 19 are positively held against rotation about their axes except when under the control of the segmental gear 59, by means of an annular flange 61 formed on the plate 25. As shown in Figs. 9 and 10, the shaft 50 is formed with a head or enlargement 62 in the form of a disk with segments cut away at opposite sides to form flat bearing surfaces 63 which ride along the upper surface of the flange 61 thereby preventing rotation of the shaft. Supplemental means for holding the jaws horizontal includes detents 64 individual to said shafts. Each detent is formed with a pair of slide bars 64a slidably mounted for vertical movement in cylindrical bearing blocks 64b mounted in the plate 32. The detent is yieldingly held against the head 62 by a coil compression spring 65. In this manner the shaft 50 and the gripping jaws carried thereby, are held steady independently of any irregularities in the track 61. In order to permit the inverting movement of the heads 19, the flange or track 61 is cut away along the gear 59.

Each pair of jaws is opened and closed at station 1 for receiving and gripping an article A, and at station 5 for discharging it, by mechanism which will now be described.

Referring to Figs. 3, 5, and 6, the plate 25 is formed with a cylindrical extension 66 concentric with the shaft 34 and within which the latter is journaled. Surrounding the upper end of extension 66 and keyed thereto, is a collar 67 formed with an annular flange 68. Surrounding the extension 66 directly beneath the collar 67, is a tubular member or sleeve 69 adapted to oscillate about the axis of the shaft 34. The member 69 is formed at its lower end with an annular flange 70 which rests on the plate 25. Pivotally mounted on the underside of the stationary flange 68 by means of pivot bolts 70', are dogs 71, 72, and 73, each of which is formed with a lug 74 (Figs. 3, 8, 9) which projects downward into position to engage the heads 57 for operating the gripping jaws. The oscillating sleeve 69 is connected to the dogs 71, 72, and 73 for swinging the latter about their pivots 71, by means of links 75 which are pivoted at their opposite ends respectively to the dogs and to the sleeve 69.

The means for oscillating the sleeve 69 comprises the Geneva disk 41 (Fig. 11) the periphery of which is shaped to form a cam track on which runs a cam follower roll 76 on a rock arm 77 keyed to a vertical rock shaft 78. Secured to the upper end of the rock shaft is a rock arm 79, to the outer end of which is pivoted one end of a link 80. The link extends inwardly within a recess 81 in the plate 25 and at its inner end is connected by a pivot 82 to the flange 70 of the oscillating member 69. The cam roll 76 (Fig. 11) is held against the cam by a coil spring 83. The cam disk 41 has a re-entrant portion 84 which allows the rock arm 77 to swing inward from the full line to the broken line position and remain in the latter position during the intermittent movement of the carriage. When the rock arm is thus swung inwardly (Fig. 11) the shaft 78 is rocked and swings the rock arm 79 inwardly from the Fig. 6 to the Fig. 5 position. This operates through the oscillating member 69 to swing the dogs 71, 72, and 73 inwardly, so that the jaws 52 are free to be swung by the springs 56 (Fig. 9) to article gripping position. In this manner each carrier 19 operates to grip articles at stations 1 and 3 and advance them with the carriage to the next station. At station 5 the article is released to the conveyor 15 and the carrier then travels empty until it again reaches station 1. When the carriage is brought to rest, the cam roll 76 runs onto the high portion of the cam track so that the rock arm 79 is swung to the Fig. 6 position and the member 69 rotated in a clockwise direction, thereby swinging the dogs about their pivots and causing them to open the article gripping jaws at stations 1, 3, and 5. The cam 84 is preferably designed to effect the opening of the gripping jaws immediately after the carriage is brought to rest after each step rotation and to permit the jaws to close just before the carriage commences its next step movement.

The operation of the dog 72 at station 3, releases the jar A at said station to a pad or holder 85 forming part of the gaging or testing machine 14. The pad 85 is then moved upward so that the jar is lifted to a gaging or testing position. The gaging machine may, for example, comprise means for gaging the diameter of the jar finish or for making other tests. Such a gaging machine is disclosed in U. S. Patent No. 2.327,629, Gauging machine, granted in my name August 24, 1943. After the tests are completed, the pad 85 is lowered to return the jar into position to be gripped by the jaws so that at the next step movement of the carriage, the jar is carried to station 4.

If the jar has met the required tests, it is retained in the gripping jaws until it reaches station 5. If, on the other hand, it is defective, the gaging apparatus operates automatically to establish an electrical circuit for the electromagnet 21 (Fig. 6) which then operates through suitable mechanism to effect the opening of the gripping jaws at station 4 and thereby releases and discharges the defective jar. The means actuated by the electromagnet includes a lever 86 (Figs. 5 to 8) mounted to swing about a stationary pivot 87. One end of the lever is connected through a link 88 to the electromagnet core. Pivotally mounted in the flange 70 of the oscillating sleeve 69 is a rock shaft 89 (Figs. 7 and 8) carrying rock arms 80' and 81' at its upper and lower ends respectively. The arm 81' is formed with a depending finger 82'.

When the electromagnet is energized, it swings the lever 86 from the broken line to the full line position (Fig. 7) and thereby moves a shoulder 90 at the free end of the lever, behind the finger 82'. When the oscillating member 69 is rotated in a clockwise direction by means of the rock arm 79, as before described, it carries with it the pivot pin 89 and as the finger 82' is held by the shoulder 90, the shaft 89 is given a rocking movement about its axis, by which the outer end of the arm 80' is swung outwardly. The arm 80' is so positioned that it engages the head 57 at station 4 and thereby opens the jaws for releasing the defective jar at said station. When the electromagnet is de-energized and the lever 86 returned, it releases the finger 82', permitting a coil tension spring 91 to rock the shaft 89 and swing the arm 80' inwardly out of the path of the heads 57. The operation of the electromagnet is controlled by timing mechanism and is timed to operate when the defective jar is at station 4.

In order to control the movements of the jars and thereby prevent more than one at a time being carried to the gripping jaws at station 1, a gate 92 (Figs. 5 and 6) is provided. The gate is mounted to swing about a pivot 93 on a bracket 94 and is actuated by the rock shaft 78 which operates through a rock arm 95 attached thereto and a link 96. While the carriage is rotating, the gate is in the Fig. 5 position and prevents the jars from advancing. When the shaft 78 is rocked to open the gripping jaws (Fig. 6) the gate swings to the Fig. 6 position and releases the foremost jar. The tail end 97 of the gate, at the same time is moved into the path of the next succeeding jar, thus permitting a single jar at a time to be advanced to the gripping jaws.

Modifications may be resorted to within the spirit and scope of my invention.

I claim:

1. The combination of a carriage, means for rotating it intermittently about a vertical axis, an annular series of article gripping units on the carriage, each comprising gripping jaws, spring means for moving the jaws to article gripping position, means for swinging the jaws to article releasing position at a plurality of stations, said releasing means including an actuating member mounted for oscillating movement about the axis of the carriage, means for oscillating said member about said axis while the carriage is at rest, dogs mounted to swing about axes having fixed positions relative to the axis of the carriage, links connecting the dogs to said oscillating member, and means actuated by said dogs for swinging the jaws to open position at predetermined stations, an electromotive device, and means actuated by said electromotive device for opening the gripping jaws of a unit at another predetermined station.

2. Article handling apparatus comprising in combination means for conveying articles in succession to a receiving station, and transfer mechanism including means for transferring each article from said receiving station to a plurality of succeeding stations, said transfer mechanism including a rotary carriage, an article gripping unit on said carriage including a pair of gripping jaws and spring actuated mechanism for closing the jaws and thereby gripping an article, means for rotating the carriage step-by-step and thereby bringing the said unit to each of a series of stations in succession, automatic means operable at certain of said stations to open the jaws and thereafter release them to the jaw closing mechanism, leaving said mechanism free to maintain the jaws in gripping position at the other of said stations, mechanism operable automatically to open the jaws at one of said last mentioned stations for releasing selected articles, and automatic means for holding said last mentioned mechanism in an inoperative position while other articles are at said last mentioned station.

3. Article transfer mechanism comprising a carriage mounted for rotation about a vertical axis, means for rotating the carriage, an article gripping unit on the carriage comprising a pair of gripping jaws, a member mounted for oscillation about the axis of the carriage, a dog mounted for pivotal movement about a vertical axis having a fixed position relative to the axis of the carriage, a link connecting said oscillating member with the dog, means for oscillating said member and thereby operating through said link to swing the dog about its pivot, and means actuated by the dog for opening said jaws.

4. Article transfer mechanism comprising a carriage mounted for rotation about a vertical axis, means for rotating the carriage, an article gripping unit on the carriage comprising a pair of gripping jaws, a member mounted for oscillation about the axis of the carriage, a dog mounted for pivotal movement about a vertical axis having a fixed position relative to the axis of the carriage, a link connecting said oscillating member with the dog, means for oscillating said member and thereby operating through said link to swing the dog about its pivot, and means actuated by said dog for swinging the jaws to open position for releasing an article held thereby, said last mentioned means including a rod in the path of said dog, links connecting said rod to said jaws, and a spring held under compression by said rod and operative to swing the jaws to an article gripping position.

5. The combination of a carriage mounted for rotation about a vertical axis, means for rotating the carriage, article gripping units on the carriage, each said unit comprising a pair of article gripping jaws pivoted on the carriage, a rod mounted in the carriage and extending radially thereof, links connecting the rod to the jaws, and a compression spring arranged to move said rod inwardly toward the axis of the carriage and thereby swing the jaws to article gripping position, dogs each mounted to swing about a vertical axis having a fixed position relative to the axis of the said carriage, a member mounted to oscillate about the axis of the carriage, links connecting the dogs with said member, the dogs being positioned to be swung into engagement with said rods, and means for oscillating said member and thereby causing the dogs to move said rods outwardly for moving the gripping jaws to article releasing position.

6. Article transfer mechanism comprising a carriage mounted for rotation about a vertical axis, article gripping units arranged in an annular series on the carriage, means for rotating the carriage intermittently step-by-step and thereby bringing said units in succession to a discharging station, each said unit comprising a pair of gripping jaws, means for actuating said jaws comprising a member mounted for oscillation about the axis of the carriage, a rock shaft mounted to rock in said member, rock arms connected to the rock shaft, means for oscillating said member, a stop device movable into the path of one of said rock arms and thereby operable to cause the rock shaft to be rocked about its axis when the said member is oscillated, and means actuated by the other said rock arm for actuating the gripping jaws of a said unit at the discharging station and thereby releasing an article from said jaws.

WILLIAM J. FEDORCHAK.